No. 751,567. PATENTED FEB. 9, 1904.
C. F. SEARCH.
KNIFE.
APPLICATION FILED OCT. 6, 1902.
NO MODEL.
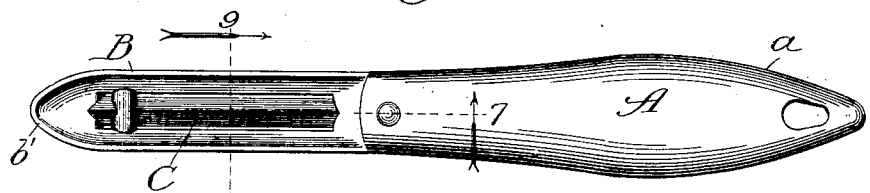
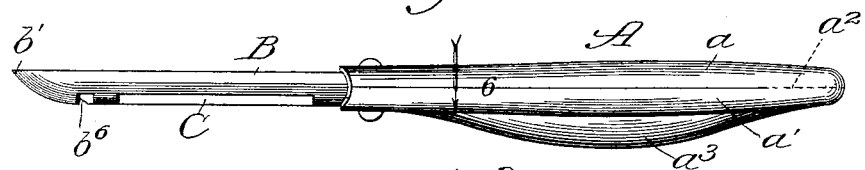
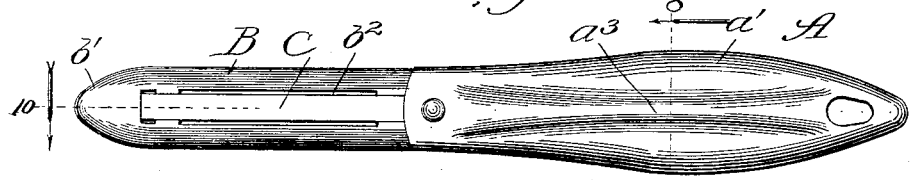
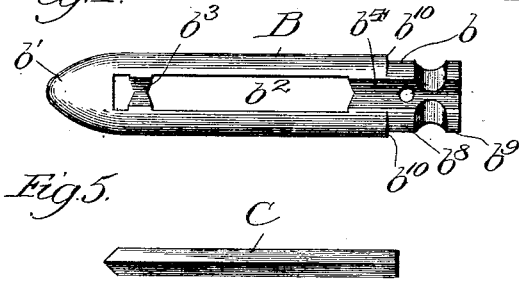
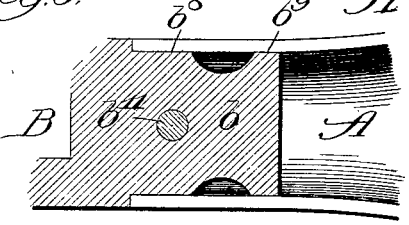
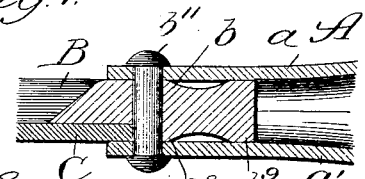
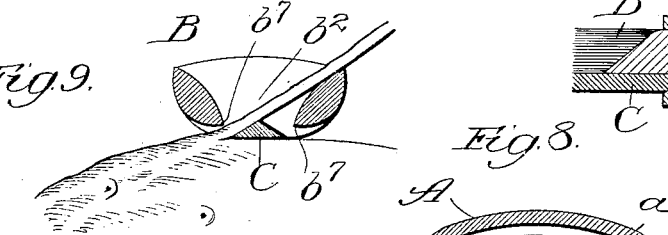
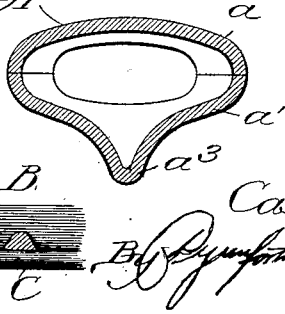
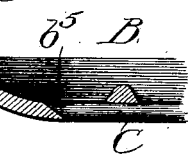
Witnesses:
Inventor:
Casper F. Search, No. 751,567. Patented February 9, 1904.

UNITED STATES PATENT OFFICE.

CASPER F. SEARCH, OF OAKPARK, ILLINOIS, ASSIGNOR, BY DIRECT AND MESNE ASSIGNMENTS, TO EDMONDS-METZEL MANUFACTURING COMPANY, OF CHICAGO, ILLINOIS, A CORPORATION.

KNIFE.

SPECIFICATION forming part of Letters Patent No. 751,567, dated February 9, 1904.

Application filed October 6, 1902. Serial No. 126,105. (No model.)

*To all whom it may concern:*

Be it known that I, CASPER F. SEARCH, a citizen of the United States, residing at Oakpark, in the county of Cook and State of Illinois, have invented a new and useful Improvement in Knives, of which the following is a specification.

My invention relates particularly to paring-knives for use in paring potatoes, although, as will appear, the improved knife is well adapted for use in paring other vegetables and fruit.

My primary object is to provide a paring-knife of improved general construction, particular attention being paid to securing a non-corrosive gage equipped with a gouge-point, a non-corrosive handle adapted to right and left hand use, and an improved removable tempered blade adapted to cut in either direction.

The improved knife is adapted to produce a thin peeling, whether used right-handedly or left-handedly, and the peeling is so directed that it will neither clog the knife nor adhere to the potato. The instrument is symmetrical with relation to a central longitudinal plane perpendicular to the under surface of its blade, so that the gouge-point admits of the right and left hand use.

The invention is shown in its preferred embodiment in the accompaning drawings, in which—

Figure 1 represents a plan view of the improved knife; Fig. 2, a side view thereof; Fig. 3, a bottom plan view; Fig. 4, a plan view of the combination gage and gouge; Fig. 5, a top view of the blade; Fig. 6, an enlarged broken section taken as indicated at line 6 of Fig. 2; Fig. 7, an enlarged broken section taken as indicated at line 7 of Fig. 1; Fig. 8, a transverse section of the handle, taken at the corresponding line of Fig. 3; Fig. 9, a transverse section of the blade and gage, taken as indicated at line 9 of Fig. 1 and showing the knife in the operation of paring a potato; and Fig. 10, a broken section taken as indicated at line 10 of Fig. 4.

In the preferred construction A represents a handle; B, a separately-formed combination gage and gouge carried thereby, and C a tempered-steel blade carried by the member B. Preferably the handle comprises upper and lower sheet-metal scales $a$ $a'$, pressed into proper shape and put together to form a hollow handle, the meeting edges at the rear portions of the scales being brazed together, as indicated by the dotted line $a^2$. The lower scale has a longitudinal rib $a^3$, which tapers from its center toward the ends of the handle. This rib is received by the concavities of the fingers when the latter are closed upon the handle.

The combination gage and gouge consists of a concavo-convex member having a stub or tang $b$ at its base end and a gouge-point $b'$ at its free end. The lower wall of this member is cut away at $b^2$ to afford a knife-receiving channel. The member is provided upon its inner surface with a cross-rib $b^3$, which has on its under side a V-shaped groove for receiving the front portion of the blade. The shank $b$ has on its under side a V-shaped groove $b^4$ for receiving the rear portion of the blade. The front end of the slot $b^2$ terminates in a beveled surface $b^5$, which receives a correspondingly-beveled surface $b^6$, provided at the adjacent extremity of the blade. This extremity of the blade also tapers, as shown in top view in Fig. 5. The blade is of V-shaped cross-section and has a flat lower face. The grooved rib $b^3$ and the beveled surface $b^5$ afford a socket for the front end of the blade. The rear portion of the blade lies snugly in the channel $b^4$, and the lower surface of the blade is substantially flush with the lower surface of the gage, except at the channel $b^2$, where the edges of the blade project beneath the edges $b^7$ of the gage, as shown in Fig. 9. The front end of the handle is open and affords a socket for the shank or tang $b$, the latter conforming in cross-section at the portions $b^8$ $b^9$ with the cross-section of the front portion of the handle. At the front portion of the shank $b$ the member B has lateral shoulders $b^{10}$, which abut against the front end of the handle, the front end of the handle being curved in plan view, as shown in Fig. 1. The front portion of the handle and the portion $b^8$ of the tang are provided with registering perforations which receive a rivet or screw $b^{11}$. The rear end of the blade projects somewhat into the handle and abuts against the rivet, so that the same rivet which secures the handle to the gage also secures the blade firmly in place. As stated, the scales of the handle are brazed together at their rear portions, and it will now be understood that when the rivet is put in place the front ends of the scales are firmly bound together, so that in the assembling it is necessary only to place a single rivet. By reason of the fact that the surfaces $b^8$ $b^9$ and the shoulders $b^{10}$ bear against the corresponding portions of the handle a very secure connection is provided. When the handle is properly japanned, the joints at the meeting edges of the scales are closed.

The member B is preferably of cast aluminium or other non-corrosive metal. The handle itself, while preferably of stamped metal, may be of cast metal or of any other suitable material. The manner of securing the parts together is of much importance, inasmuch as it permits the different parts of the knife to be made from different materials, each material particularly fitted for its purpose and the parts to be assembled at a moderate cost, a consideration of prime importance in an article of this character.

The manner of use will be readily understood. Assuming the knife to be used as a right-handed implement, the cut is made as shown in Fig. 9. As there shown, the peeling is directed by the beveled edge of the blade up through and over the opposite side of the gage. In use the implement is drawn somewhat as the cut is made, so that the peeling is curled forward somewhat, falling clear of the potato. It is obvious that the depth of cut may be regulated by tilting the implement upon its axis. After the potato is peeled the gouge-point may be employed for removing the eyes of any unsound portion of the vegetable.

Changes in details of construction within the spirit of my invention may be made. Hence no undue limitation should be understood from the foregoing detailed description.

What I regard as new, and desire to secure by Letters Patent, is—

1. A paring-knife comprising a handle having a two-edged blade secured thereto, and a gage secured to said handle having a longitudinal channel open through the gage for receiving the blade and presenting two gage edges each extending along and coacting with one of the edges of said blade, said gage having a socket toward the end opposite said handle for receiving the corresponding end of the blade and holding said blade in proper relation to said gage edges, substantially as described.

2. An implement of the character described, comprising a gage equipped at its front portion with a beveled surface, a blade having a corresponding beveled surface at its front end, a suitable handle, and means for securing the rear portion of the blade in place, for the purpose set forth.

3. An implement of the character described, comprising a gage having a longitudinal channel and equipped near its opposite ends with V-shaped grooves, the free extremity of said gage having a socket for the corresponding extremity of the blade, a suitable handle, and means for securing the rear extremity of the blade in the groove which receives it, for the purpose set forth.

4. An implement of the character described, comprising a gage having a longitudinal blade-receiving channel with two edges coacting with the blade, a V-shaped blade received by said channel and having cutting edges coacting with the corresponding edges of the gage, and a handle provided on its lower side with a central longitudinal enlargement, for the purpose set forth.

5. An implement of the character described, comprising a gage equipped at one end with a gouge-point and provided with a longitudinal blade-receiving channel with two edges coacting with the blade, a two-edged blade received by said channel, and a suitable handle, for the purpose set forth.

CASPER F. SEARCH.

In presence of—
  ALBERT D. BACCI,
  W. B. DAVIES.